(12) United States Patent
Im et al.

(10) Patent No.: US 8,283,070 B2
(45) Date of Patent: Oct. 9, 2012

(54) ANODE ACTIVE MATERIAL AND LITHIUM BATTERY USING THE SAME

(75) Inventors: Dongmin Im, Seoul (KR); Dai-kyu Kim, Seoul (KR); Han-su Kim, Seoul (KR); Jin-hwan Park, Seoul (KR); Gue-sung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 783 days.

(21) Appl. No.: 11/606,658

(22) Filed: Nov. 29, 2006

(65) Prior Publication Data

US 2007/0128516 A1   Jun. 7, 2007

(30) Foreign Application Priority Data

Dec. 1, 2005   (KR) .................. 10-2005-0116633

(51) Int. Cl.
  *H01M 4/62*   (2006.01)
  *H01M 4/13*   (2010.01)
  *H01M 4/88*   (2006.01)

(52) U.S. Cl. .......... 429/217; 429/231.95; 252/182.1

(58) Field of Classification Search .......... 429/217, 429/231.95; 252/182.1
See application file for complete search history.

(56) References Cited

U.S. PATENT DOCUMENTS

| | | | |
|---|---|---|---|
| 5,041,346 A * | 8/1991 | Giles .................. | 429/309 |
| 5,354,631 A * | 10/1994 | Chaloner-Gill et al. ..... | 429/137 |
| 6,172,152 B1 * | 1/2001 | Kim et al. .................. | 524/379 |
| 7,226,693 B2 | 6/2007 | Tomihara et al. | |
| 2005/0191556 A1 | 9/2005 | Kim et al. | |

FOREIGN PATENT DOCUMENTS

| | | |
|---|---|---|
| JP | 04-272654 | 9/1992 |
| JP | 6-318454 | 11/1994 |
| JP | 10-3920 | 1/1998 |
| JP | 2000-173608 | 6/2000 |
| JP | 2002-203543 | 7/2002 |
| JP | 2003-142097 | 5/2003 |
| JP | 2006-139967 | 6/2006 |
| JP | 2007-042285 | 2/2007 |
| KR | 10-2005-0043674 | 5/2005 |
| KR | 10-2005-0063655 | 6/2005 |
| KR | 10-2005-0071752 | 7/2005 |

OTHER PUBLICATIONS

Patent Abstracts of Japan, Publication No. 06-318454; Publication Date: Nov. 15, 1994; in the name of Ito Shuji et al.

(Continued)

*Primary Examiner* — Karie O'Neill Apicella
(74) *Attorney, Agent, or Firm* — Christie, Parker & Hale, LLP (57) ABSTRACT

An anode active material and a lithium battery employing the same are provided. In one embodiment of the anode active material, a —($CH_2CH_2O$)— repeating unit is bonded to the surface of metal particles that contain metals that can be alloyed with lithium. The repeating unit prevents reactions between the metal particles and the electrolyte solution. Also, due to its elasticity, the repeating unit absorbs part of the volume expansion of the metal particles. The repeating unit also prevents the metal particles from condensing, thereby enhancing dispersion properties. Accordingly, the inventive anode active material has high capacity and excellent capacity retention during repeated charging and discharging, thereby providing a lithium battery with a long cycle life.

19 Claims, 8 Drawing Sheets

OTHER PUBLICATIONS

Patent Abstracts of Japan, Publication No. 10-003920; Publication Date: Jan. 6, 1998; in the name of Satou Asako et al.
Korean Patent Abstracts, Publication No. 1020050043674 A; Publication Date: May 11, 2005; in the name of Soon Ho Ahn et al.
Korean Patent Abstracts, Publication No. 1020050063655 A; Publication Date: Jun. 28, 2005; in the name of Akira Takamuku et al.
Office Action dated May 29, 2007 for corresponding Korean Patent Application No. 10-2005-0116633.
Chinese Office Action for corresponding Chinese Application No. 200610163633X with English translation noting U.S. Patent Nos. 5,354,631 and 6,172,152 previously cited in the U.S. Office action dated Oct. 1, 2008.
SIPO Office action dated Feb. 5, 2010, for corresponding Chinese application 20061016363.3X, with English translation, noting U.S. reference previously cited in U.S. Office action dated Jul. 31, 2009.
Japanese Patent Office Action dated Mar. 2, 2010, for corresponding Japanese Patent Application No. 2006-313381 listing the cited references in this IDS.
KIPO Notice of Allowance dated Aug. 28, 2007, for Korean priority Patent application 10-2005-0116633, 4 pages.

* cited by examiner

Fig. 1

(PRIOR ART)

ANODE ACTIVE MATERIAL AND LITHIUM BATTERY USING THE SAME

CROSS-REFERENCE TO RELATED PATENT APPLICATION

This application claims priority to and the benefit of Korean Patent Application No. 10-2005-0116633, filed on Dec. 1, 2005, in the Korean Intellectual Property Office, the entire content of which is incorporated herein by reference.

BACKGROUND OF THE INVENTION

1. Field of the Invention

The present invention relates to an anode active material and a lithium battery using the same, and more particularly, to an anode active material having a large capacity and excellent capacity retention and a lithium battery having a long cycle life using the same.

2. Description of the Related Art

When lithium metal is used as the anode active material in lithium batteries, short-circuits may occur due to the formation of dendrites, and a risk of explosion results. Accordingly, carbon-based materials are widely used as anode active materials instead of lithium metal.

Examples of carbon-based active materials used as anode active materials in lithium batteries include crystalline carbon, such as natural graphite and artificial graphite, and amorphous carbon, such as soft carbon and hard carbon. Although amorphous carbon has good capacity, when amorphous carbon is used, many of the charge/discharge reactions are irreversible. Natural graphite is the most commonly used crystalline-based carbon, and the theoretical capacity of natural graphite can be as high as 372 mAh/g. Therefore, crystalline carbon is widely used as the anode active material. However, although the 372 mAh/g theoretical capacity of such carbon-based active materials (including graphite) is currently considered to high, this capacity may not be sufficient for future lithium batteries which may require higher capacities.

Accordingly, research into metal-based anode active materials and intermetallic compound-based anode active materials has been actively conducted. For example, research into lithium batteries using metals or semimetals such as aluminum, germanium, silicon, tin, zinc, lead, etc, as the anode active materials has been conducted. Such materials are known to have large capacities, high energy densities, and good insertion/extraction capabilities compared to carbon-based anode active materials. Thus, lithium batteries having large capacities and high energy densities can be prepared using these materials. For example, pure silicon is known to have a high theoretical capacity of 4017 mAh/g.

Figure 1:
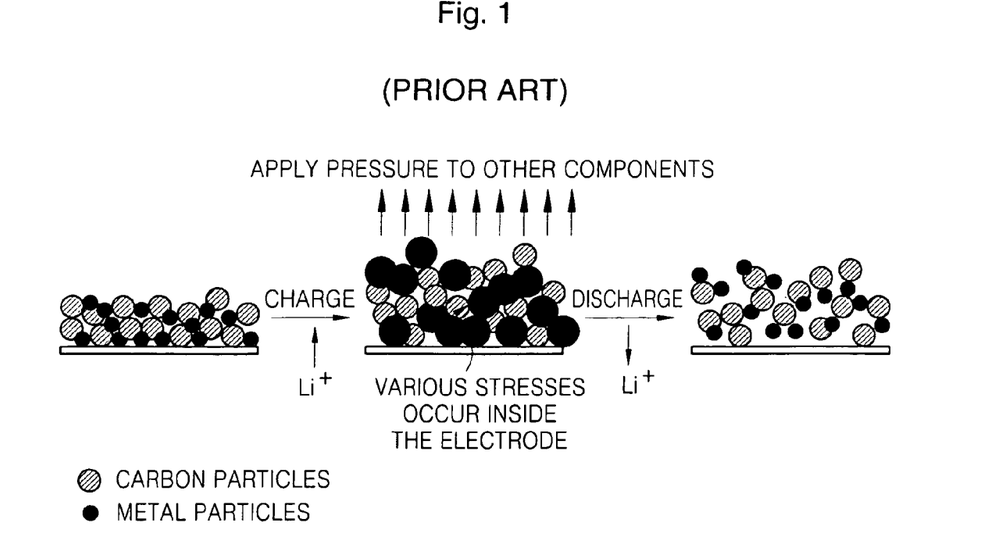
FIG. 1 is a schematic illustrating the changes in a prior art anode active material undergoing charge and discharge.

However, such materials have shorter cycle lives than carbon-based materials, and thus cannot be put to practical use. When inorganic particles such as silicon or tin are used as the anode active material, the volume of inorganic particles changes considerably during charge/discharge cycles. This may result in the degradation of the electronic conduction network between the active material particles or may result in the detachment of the anode active material from the anode current collector, as shown in FIG. 1. That is, the volume of inorganic material such as silicon or tin increases by about 300 to 400% due to alloying with lithium during charging, and the volume decreases due to extraction of lithium during discharging. Therefore, after repeated charge/discharge cycles, spaces may be generated between the active material particles and electrical insulation may occur, thereby causing the capacity of the battery to rapidly decrease.

To address these concerns, an anode active material including a mixture of flakes of metal or alloy powder, flakes of carbon powder, and binder has been produced. However, since the mixture is obtained by simple mixing, stress occurs in the battery due to the expansion and contraction of particles upon repeated charging and discharging, resulting in a serious interruption of electronic conduction.

In addition, a lithium secondary battery in which nanoparticles of metals are coated with carbon has also been produced. However, the carbon (which is brittle) on the surface of the nanoparticles cracks due to expansion during charging, and spaces are generated between carbon and metal nanoparticles due to contraction during discharging. Therefore, improvements in battery cycle life are restricted.

Therefore, a need exists for an anode active material with high capacity and good capacity retention, and for a lithium battery with a long cycle life employing such an anode active material.

SUMMARY OF THE INVENTION

In one embodiment of the present invention, an anode active material has high capacity and good capacity retention properties.

In another embodiment of the present invention, a lithium battery employs the anode active material.

According to one embodiment of the present invention, an anode active material comprises metal particles that can be alloyed with lithium, and a material layer on the surface of the metal particles, wherein the material layer comprises substituted or unsubstituted alkylene oxide repeating units. In one embodiment, the substituted or unsubstituted alkylene oxide repeating unit may include a substituted or unsubstituted ethylene oxide repeating unit.

In another embodiment, the substituted or unsubstituted alkylene oxide repeating unit may have a weight-average molecular weight ranging from about 400 to about 500,000.

In yet another embodiment, the substituted or unsubstituted alkylene oxide repeating unit may include from 9 to 10,000 repeating units.

In another embodiment, the substituted or unsubstituted alkylene oxide repeating unit may be a substituted or unsubstituted oligoethylene glycol or polyethylene glycol.

In yet another embodiment, the substituted or unsubstituted alkylene oxide repeating unit may be polyethylene glycol.

In one embodiment, one end of the substituted or unsubstituted alkylene oxide repeating unit may be directly bonded to the surface of the metal particles. In another embodiment, one end of the substituted or unsubstituted alkylene oxide repeating unit may be bonded to the metal particles via a siloxane bond. The bond may be a covalent bond.

Nonlimiting examples of suitable metal particles that can be alloyed with lithium include Si, Sn, Ge, Pb, Zn, Ag, Au, and Al, alloys thereof and mixtures thereof.

According to another embodiment of the present invention, a lithium battery employs the anode active material.

BRIEF DESCRIPTION OF THE DRAWINGS

The above and other features and advantages of exemplary embodiments of the present invention will become more apparent by reference to the following detailed description when considered in conjunction with the attached drawings, in which.

DETAILED DESCRIPTION OF THE INVENTION

The present invention will now be described with reference to the accompanying drawings, in which exemplary embodiments of the invention are shown. However, it is understood that the invention may be embodied in many different forms and should therefore not be construed as limited to the specific embodiments set forth herein. Rather, the described embodiments are provided for illustrative purposes only.

An anode active material according to one embodiment of the present invention includes a material layer containing an alkylene oxide repeating unit formed on the surface of metal particles that can be alloyed with lithium. The alkylene oxide repeating unit can be substituted or unsubstituted. By absorbing part of the volume expansion of the metal particles, the material layer prevents reactions between the anode active material and the solvent, and also prevents decreases in battery capacity that result from repeated charging and discharging. Accordingly, the resultant battery has excellent capacity retention. In addition, by preventing the anode active material from aggregating, the material layer imparts improved dispersion properties when the anode active material is applied to an electrode. In particular, in one embodiment of the present invention, metal particles are used to improve the capacity of carbon-based materials.

For example, although the volume of silicon particles changes significantly during charging and discharging, silicon has a theoretical capacity of 4017 mAh/g, thereby providing excellent battery capacity. The cycle properties of conventional batteries may degrade due to volume expansion of silicon particles. However, the material layer according to one embodiment of the present invention provides elasticity and restoring force on the surface of the metal particles in the active material, thereby allowing the battery to maintain its cycle properties.

The substituted or unsubstituted alkylene oxide repeating unit may have a weight-average molecular weight ranging from about 400 to about 500,000. When the weight-average molecular weight is less than about 400, the material layer cannot sufficiently protect the metal particles. When the weight-average molecular weight is greater than about 500,000, the material layer may degrade the electrical properties of the anode active material.

The substituted or unsubstituted alkylene oxide repeating unit may comprise from 9 to 10,000 substituted or unsubstituted alkylene oxide repeating units. When there are less than 9 repeating units, the material layer cannot sufficiently protect the metal particles. When there are more than 10,000 repeating units, the material layer may degrade the electrical properties of the anode active material. The substituted or unsubstituted alkylene oxide repeating unit may be substituted or unsubstituted oligoethylene glycol or polyethylene glycol. In one exemplary embodiment, the substituted or unsubstituted alkylene oxide repeating unit is polyethylene glycol, for example, polyethylene glycol having from 9 to 10,000 repeating units.

In one embodiment, the alkylene oxide repeating unit is a substituted alkylene oxide repeating unit in which at least one hydrogen atom is substituted with a halogen atom, an alkyl group, an aryl group, a hydroxyl group, a carboxyl group, an amine group, a nitro group, a cyano group, or the like.

A method of preparing an anode active material according to one embodiment of the present invention will now be described. The material layer containing the alkylene oxide repeating units is formed on the surface of the metal particles that can be alloyed with lithium. For example, the material layer can be directly bonded to the surface of the metal particles or can be bonded to the surface of the metal particles via a siloxane bond. One example of the bond is a covalent bond.

Figure 2:
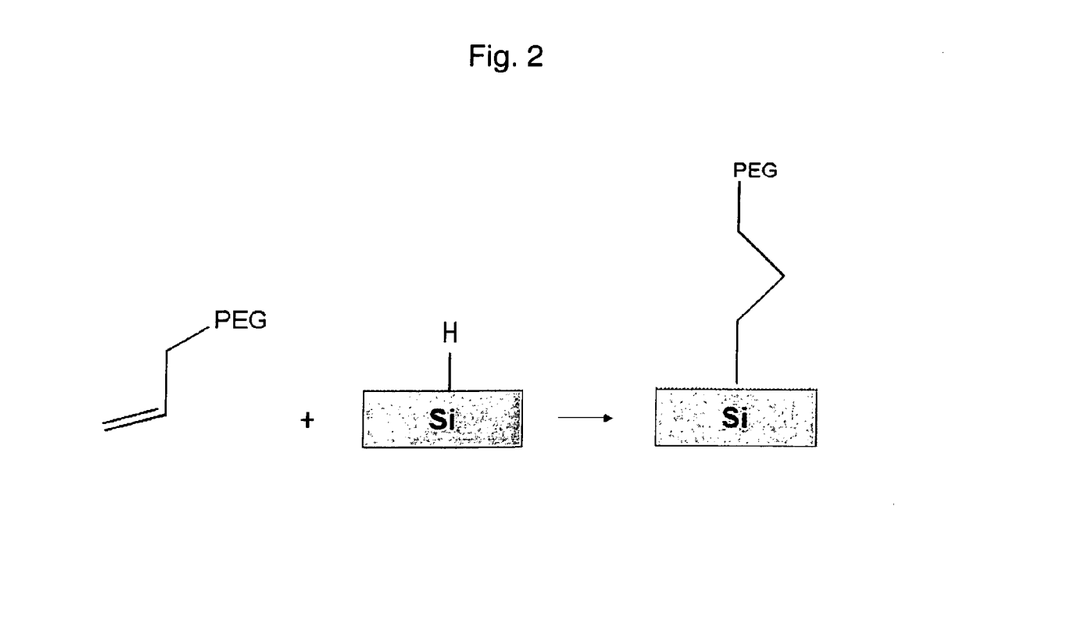
FIG. 2 is a schematic illustrating a method of modifying the surface of a metal particle according to one embodiment of the present invention.

As shown in FIG. 2, the material layer is directly bonded to the surface of the metal particles. Referring to FIG. 2, the alkylene oxide repeating unit can be attached to one end of an alkene. As shown, polyethylene glycol is attached to one end of an alkene. The other end of the alkene is bonded to a hydrogen atom site on the surface of the metal particle. The bonding may be performed through ball milling, a thermal reaction such as reflux, an exposure reaction, or the like.

To bond the alkylene oxide repeating units to the surface of the metal particles, an alkene can first be bonded to the metal particles, and then the alkylene oxide repeating units can be bonded to the alkene. That is, the material layer containing alkylene oxide repeating units can be formed by bonding the repeating unit to the alkene before or after the alkene is bonded to the metal particles.

The metal particle having a hydrogen atom site can be obtained by removing an oxide from the surface of the metal particle by treating the metal particle with a solution such as HF or $NH_4F$.

Figure 3:
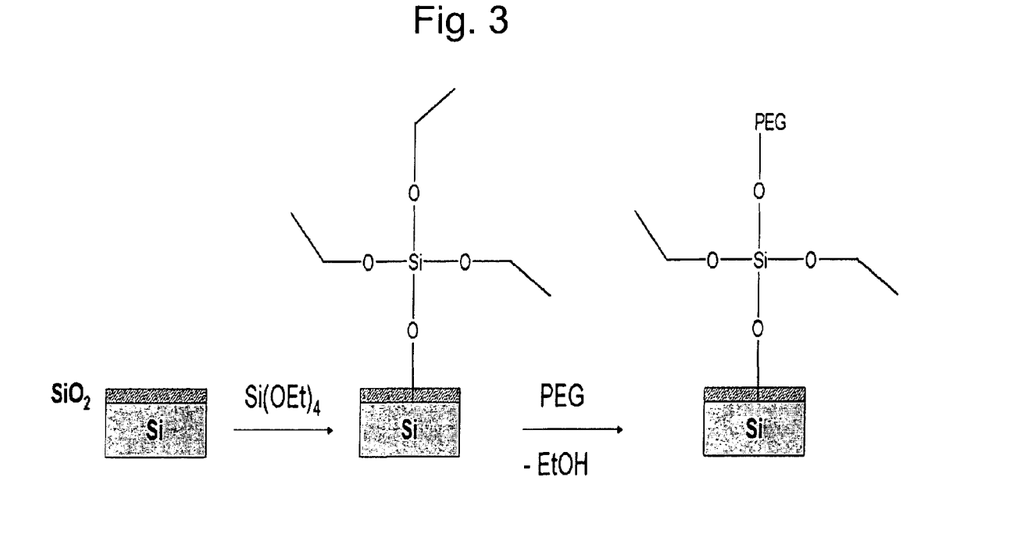
FIG. 3 is a schematic illustrating a method of modifying the surface of a metal particle according to another embodiment of the present invention.
Figure 4:
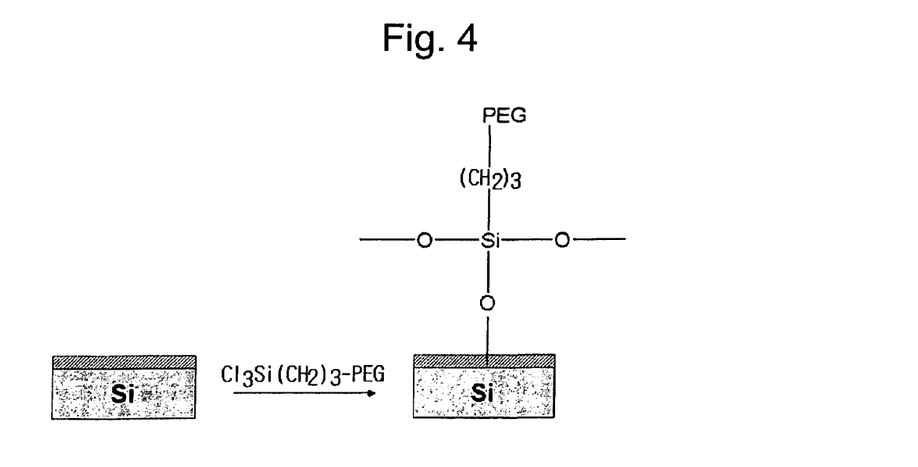
FIG. 4 is a schematic illustrating a method of modifying the surface of a metal particle according to yet another embodiment of the present invention.

Alternatively, the alkylene oxide repeating unit can be bonded to the surface of the metal particle via a siloxane bond, as illustrated in FIGS. 3 and 4. Most metals have an oxide layer on their surface that is formed by natural oxidation, thus forming hydroxyl groups on the surface of the metals. Such hydroxyl groups easily bond with an alkoxysilane, a halosilane, or the like to form a siloxane bond on the surface of metals. Then, another end of the alkoxysilane or halosilane can be exchanged with the alkylene oxide repeating unit to form a bond between the repeating unit and the surface of the metal particle. The siloxane bond can be connected to an adjacent siloxane to form a network structure. The alkylene oxide can be more strongly bonded to the surface of the metal by such a network structure. The bonding may be performed by ball milling to prevent the metal particles from aggregating. The bonding may also be performed using a thermal reaction such as reflux, an exposure reaction, or the like.

According to another method, the alkylene oxide repeating unit can be bonded with alkoxysilane or halosilane, and then bonded to the surface of metal.

The metal particle on which the alkylene oxide repeating unit is formed can be any metal particle that can be alloyed with lithium. Nonlimiting examples of suitable metals include Si, Sn, Ge, Pb, Zn, Ag, Au, and Al, alloys thereof and mixtures thereof.

The material layer containing alkylene oxide repeating units formed on the surface of metal particles can absorb part of the volume expansion of the metal particles during charging and discharging and prevent side reactions between the metal particles and solvents. In addition, by preventing the metal particles from aggregating, the material layer improves dispersion properties when the anode active material is applied to electrodes.

Figure 10:
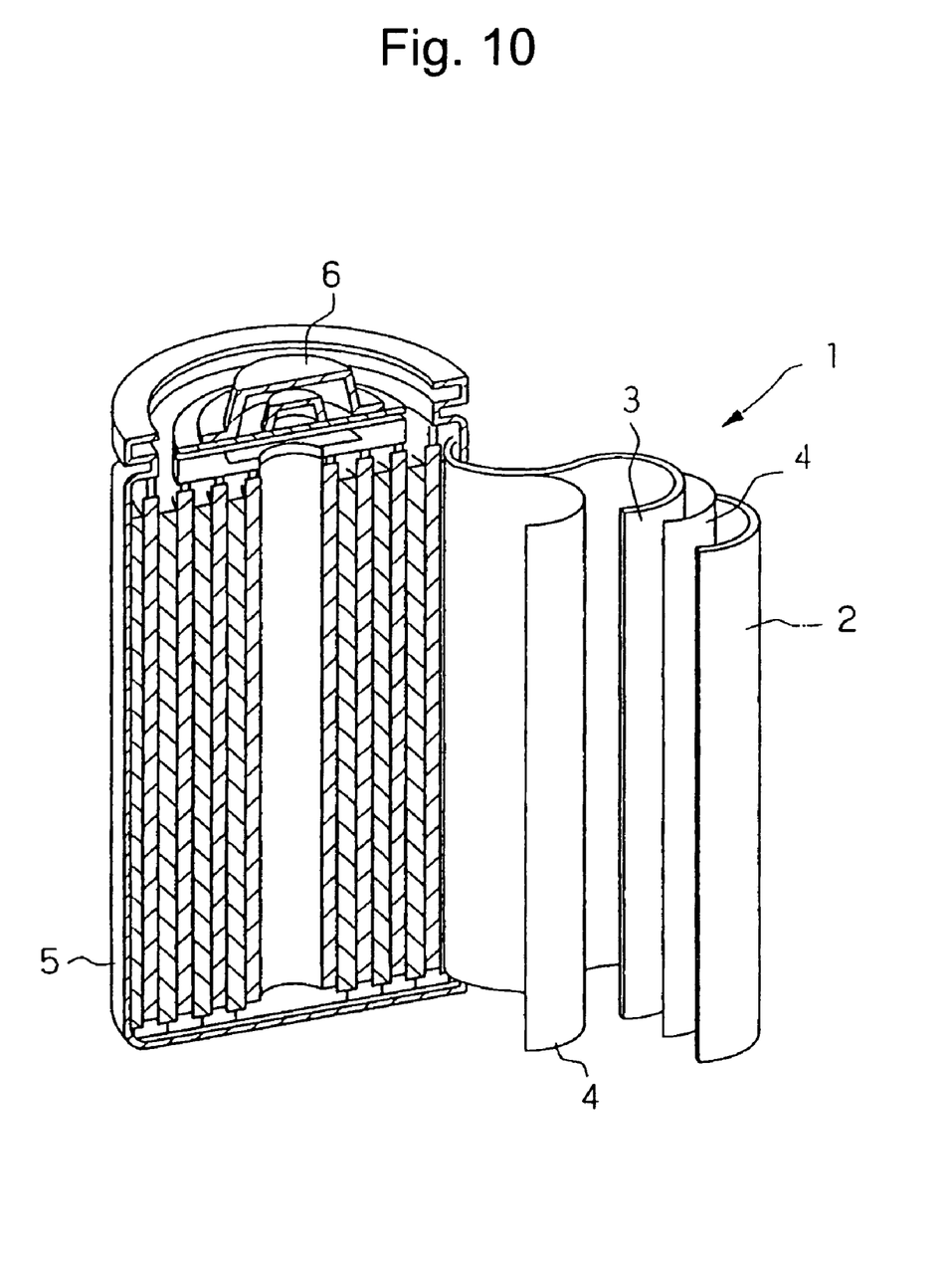
FIG. 10 is a schematic perspective view of a lithium battery according to one embodiment of the present invention.

The obtained anode active material can be effectively used in lithium batteries. A lithium battery according to one embodiment of the present invention is illustrated in FIG. 10. As shown, the battery 1 includes an electrode assembly comprising an anode 2, a cathode 3 and a separator 4. The electrode assembly is encased within a battery case 5 and sealed with a cap assembly 6 to complete the battery 1. A lithium battery according to one embodiment of the present invention can be manufactured as follows.

First, a cathode active material, a conductive material, a binder, and a solvent are mixed to prepare a cathode active material composition. The cathode active material composition is coated directly on an aluminum current collector and dried to prepare a cathode plate. Alternatively, the cathode active material composition is cast on a separate support to form a film, and then separated from the support and laminated on an aluminum current collector to prepare a cathode plate.

The cathode active material may be any lithium-containing metal oxide that is commonly used in the art. Nonlimiting examples of suitable lithium-containing metal oxides include $LiCoO_2$, $LiMn_xO_{2x}$, $LiNi_{1-x}Mn_xO_{2x}$(x=1, 2), $Ni_{1-x-y}Co_xMn_yO_2$ ($0\leq x\leq 0.5$, $0\leq y\leq 0.5$), etc.

One nonlimiting example of a suitable conductive material is carbon black. Nonlimiting examples of suitable binders include vinylidenefluoride/hexafluoropropylene copolymers, polyvinylidenefluoride, polyacrylonitrile, polymethylmethacrylate, polytetrafluoroethylene and mixtures. Styrene butadiene rubber polymers may also be used as the binder. Nonlimiting examples of suitable solvents include N-methylpyrrolidone, acetone, water, etc. The amounts of the cathode active material, the conductive material, the binder, and the solvent used are those commonly used in lithium batteries.

Similarly, an anode active material, a conductive material, a binder, and a solvent are mixed to prepare an anode active material composition. The anode active material composition is coated directly on a copper current collector to prepare an anode plate. Alternatively, the anode material composition is cast on a separate support to form a film, and then separated from the support and laminated on the copper current collector to prepare an anode plate. The amounts of the anode active material, the conductive material, the binder, and the solvent are those commonly used in lithium batteries.

The anode active material is the anode active material according to an embodiment of the present invention, as described above. The conducting agent, the binder and the solvent in the anode active material composition are the same as those in the cathode active material composition. If desired, a plasticizer may be added to the cathode active material composition and the anode active material composition to produce pores inside the electrode plates.

Any separator commonly known in the field of lithium batteries may be used. In particular, the separator may have low resistance to ion transfer of an electrolyte and good electrolyte impregnation properties. Nonlimiting examples of suitable separators include glass fibers, polyester, Teflon, polyethylene, polypropylene, polytetrafluoroethylene (PTFE), and combinations thereof. Other suitable separators include non-woven fabrics and woven fabrics. In more detail, in a lithium ion battery, a windable separator made of a material such as polyethylene or polypropylene may be used. On the other hand, in a lithium ion polymer battery, a separator that can be easily impregnated with an organic electrolyte solution may be used. The separators may be manufactured according to the following method.

A polymer resin, a filler, and a solvent are mixed to prepare a separator composition. Then, the separator composition is coated directly on an electrode and dried to form a separator film. Alternatively, the separator composition is cast on a support and dried to form a film, and then removed from the support and laminated on an electrode.

The polymer resin is not particularly limited and may be any material that can be used as a binder for an electrode plate. Nonlimiting examples of suitable polymer resins include vinylidenefluoride/hexafluoropropylene copolymers, polyvinylidenefluoride, polyacrylonitrile, polymethylmethacrylate, and mixtures thereof. In an exemplary embodiment, a vinylidenefluoride/hexafluoropropylene copolymer having from about 8 to about 25 wt % of hexafluoropropylene may be used.

The separator is positioned between the cathode plate and the anode plate to form a battery structure. The battery structure is wound or folded and encased in a cylindrical battery case or a square battery case, and an organic electrolyte solution is then injected into the battery case to complete a lithium ion battery.

Alternatively, the battery structure may also be laminated to form a bi-cell structure and impregnated with an organic electrolyte solution. The resultant structure is encased in a pouch and sealed to complete a lithium ion polymer battery.

The organic electrolytic solution includes a lithium salt and a mixed organic electrolytic solution including a high dielectric constant solvent and a low boiling point solvent, and, if necessary, further includes various additives such as an overcharge protecting agent.

The high dielectric constant solvent used in the organic electrolytic solution is not particularly restricted and can be any such solvent commonly used in the art. Nonlimiting examples of suitable high dielectric constant solvents include γ-butyrolactone, cyclic carbonates, such as ethylene carbonate, propylene carbonate or butylene carbonate, and the like.

The low boiling point solvent used in the organic electrolyte solution is also not particularly restricted and can be any such solvent commonly used in the art. Nonlimiting examples of suitable low boiling point solvents include dimethoxyethane, diethoxyethane, fatty acid ester derivatives, chain carbonates, such as dimethyl carbonate, ethylmethyl carbonate, diethyl carbonate or dipropyl carbonate, and the like.

The volumetric ratio of the high dielectric constant solvent to the low boiling point solvent may range from about 1:1 to about 1:9. When the ratio is outside this range, the discharge capacity and charge/discharge cycle life of the battery may degrade.

The lithium salt used in the organic electrolytic solution is any lithium salt that is commonly used in lithium batteries. Nonlimiting examples of suitable lithium salts include $LiClO_4$, $LiCF_3SO_3$, $LiPF_6$, $LiN(CF_3SO_2)$, $LiBF_4$, $LiC(CF_3SO_2)_3$, $LiN(C_2F_5SO_2)_2$, and mixtures thereof.

The concentration of the lithium salt in the organic electrolytic solution may range from about 0.5 to about 2 M. When the concentration of the lithium salt is less than about 0.5 M, the conductivity of the electrolytic solution is low, and thus the performance of the electrolytic solution is low. When the concentration of the lithium salt is greater than about 2.0 M, the viscosity of the electrolytic solution is high, and thus the mobility of lithium ions is reduced.

Hereinafter, the present invention will be described with reference to the following examples. The following examples are for illustrative purposes only and are not intended to limit the scope of the invention.

EXAMPLE 1

0.5 g of silicon particles (Noah Technologies, U.S.A.) with an average diameter of 100 μm, 1 ml of $Si(OEt_4)$, and 0.5 g of polyethylene glycol with a molecular weight of 1,500 were added to 5 ml of tetraglyme and ball milling was performed using 6 zirconia balls in a 30 ml high density polyethylene container for 30 minutes. The resultant product was diluted with 200 ml of tetrahydrofuran and ultracentrifuged three times with ethanol at 10,000 rpm for 15 minutes. The resulting product was dried overnight. An anode active material was prepared using 0.65 g of the silicon particles on which the polyethylene glycol was formed through a siloxane bond.

EXAMPLE 2

0.5 g of silicon particles (Noah Technologies, U.S.A.) with an average diameter of 100 μm were treated with a HF solution for 10 seconds, and immediately dried in nitrogen gas to obtain silicon particles having hydrogen atoms at their ends. Separately, $CH_2=CH(CH_2)_9(OCH_2CH_2)_{30}OCH_3$ was dissolved in mesitylene in a schlenk tube to prepare a solution having a concentration of 1 mM. The silicon particles having hydrogen atoms at their ends were immersed in the solution. The solution was refluxed by heating it in an oil bath under a nitrogen atmosphere for 2 hours. Then, the resulting product was cooled to room temperature, and the silicon particles were separated. The separated silicon particles were sequentially washed with petroleum ether, ethanol and dichloromethane, and dried under a nitrogen stream to prepare an anode active material using 0.59 g of silicon particles on which the polyethylene glycol was formed.

EXAMPLE 3

$SiCl_3(CH_2)_9(OCH_2CH_2)_3OCH_3$ was dissolved in toluene in a schlenk tube to prepare a solution having a concentration of 2 mM. 0.5 g of silicon particles (Noah Technologies, U.S.A.) with an average diameter of 100 μm were immersed in the solution under a nitrogen atmosphere, and placed at room temperature for 6 hours. Then, the silicon particles were separated. The separated silicon particles were washed with toluene, and dried under a nitrogen stream. Then, the resulting product was plasticized at 110° C. for 30 minutes to prepare an anode active material using 0.56 g of the silicon particles on which the polyethylene glycol was formed through a siloxane bond.

COMPARATIVE EXAMPLE 1

Silicon particles (Noah Technologies, U.S.A.) having untreated surfaces and having an average diameter of 100 μm were used to prepare an anode active material.

EXPERIMENTAL EXAMPLE 1

FT-IR analysis

Figure 5:
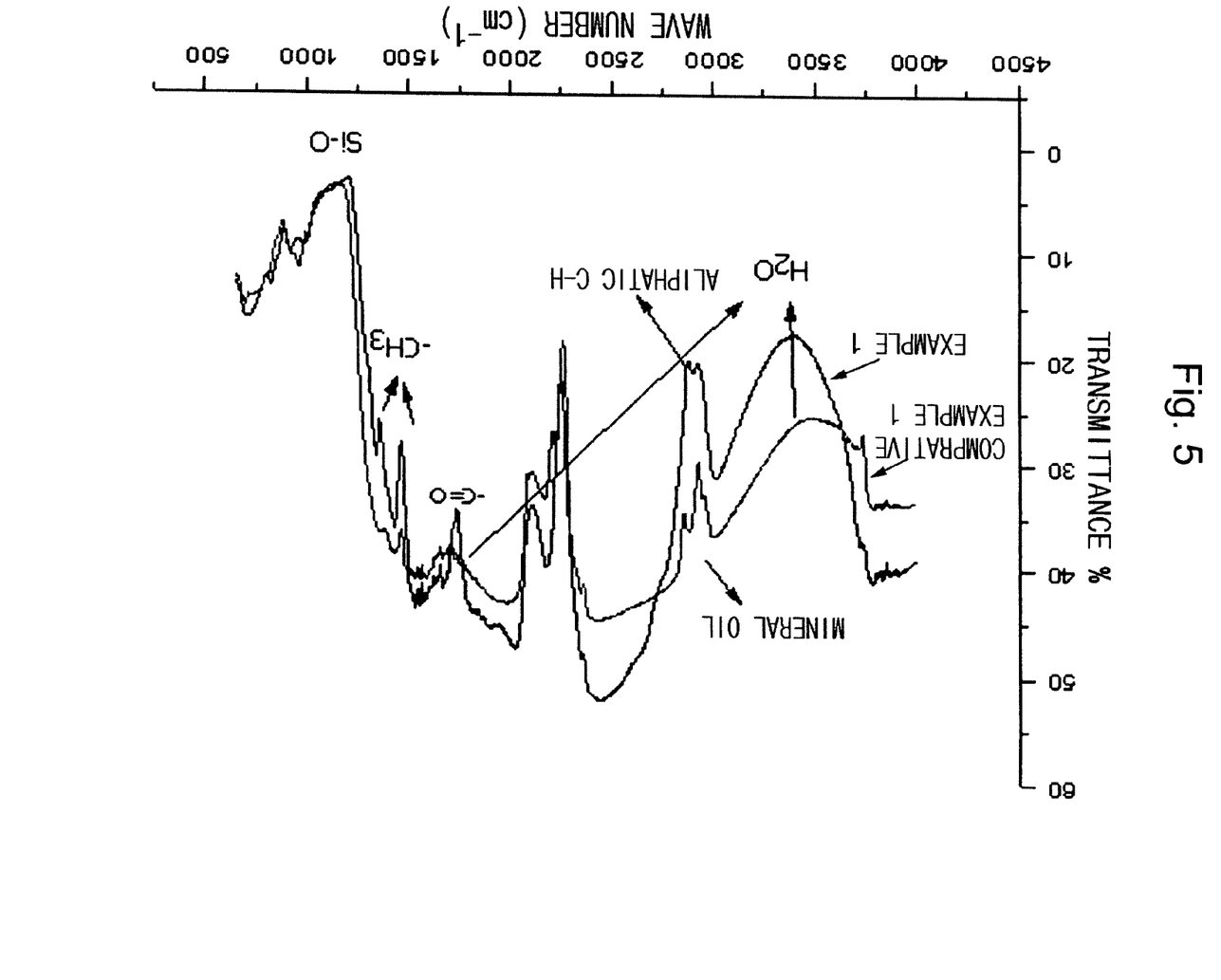
FIG. 5 is an FT-IR spectrum of anode active materials prepared according to Example 1 and Comparative Example 1.

Fourier transform-infrared (FT-IR) analysis in the drift mode was performed on the anode active materials prepared according to Example 1 and Comparative Example 1. The results are shown in FIG. 5. Referring to FIG. 5, it was observed that aliphatic hydrocarbon was formed in the anode active material of Example 1. The peak indicating the presence of the hydrocarbon may result from the polyethylene glycol or tetraethyl orthosilicate.

EXPERIMENTAL EXAMPLE 2

Analysis of Discharged Gas

The anode active materials obtained in Example 1 and Comparative Example 1 were heated from 50 to 800° C. at a rate of 10° C./min. Gas generated during the heating was analyzed using a mass spectrometer and the results are illustrated in FIGS. 6 and 7.

Figure 6:
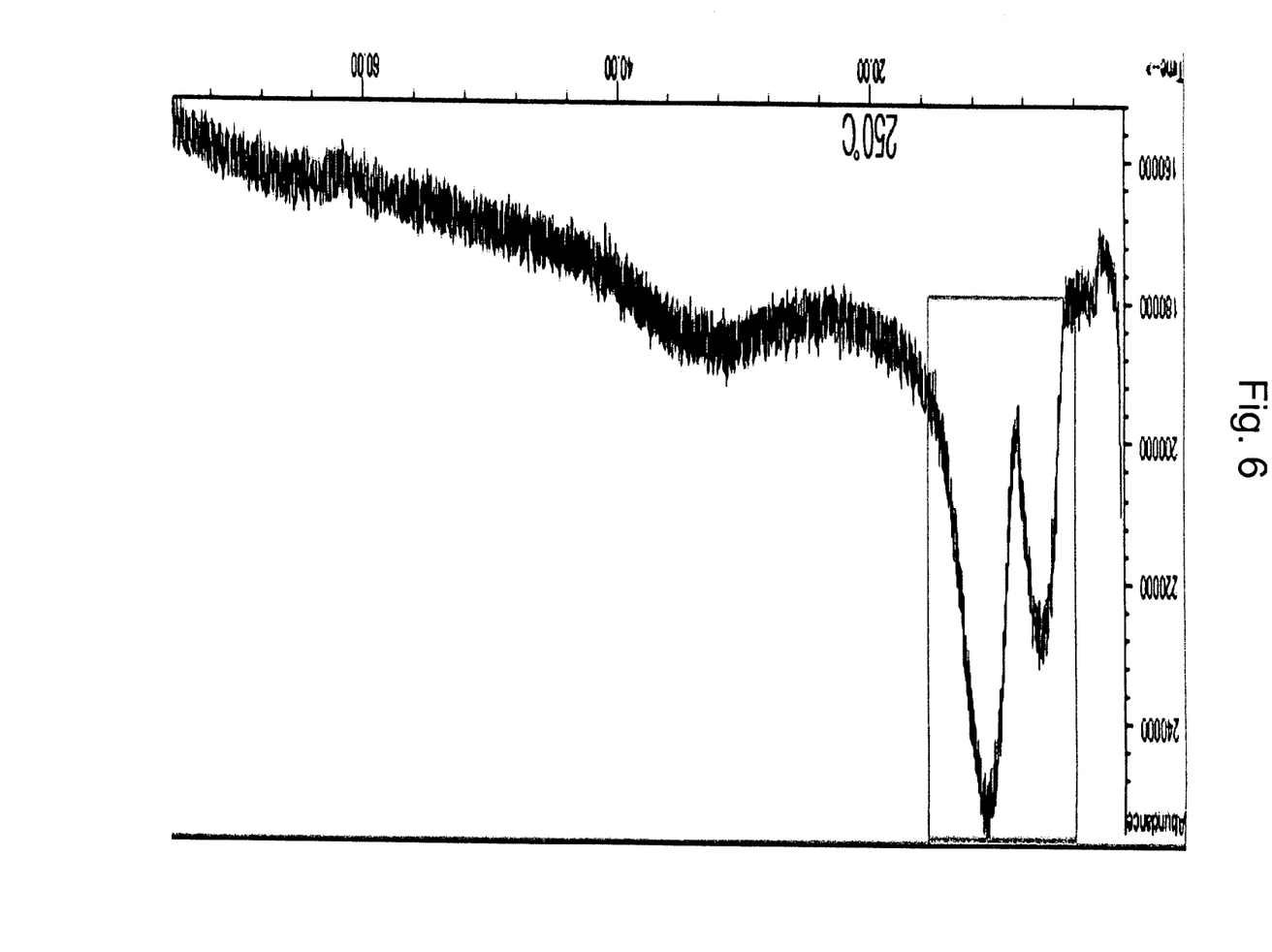
FIG. 6 is a total ion chromatogram of gas discharged from the anode active material prepared according to Example 1 analyzed using a mass spectrometer.
Figure 7:
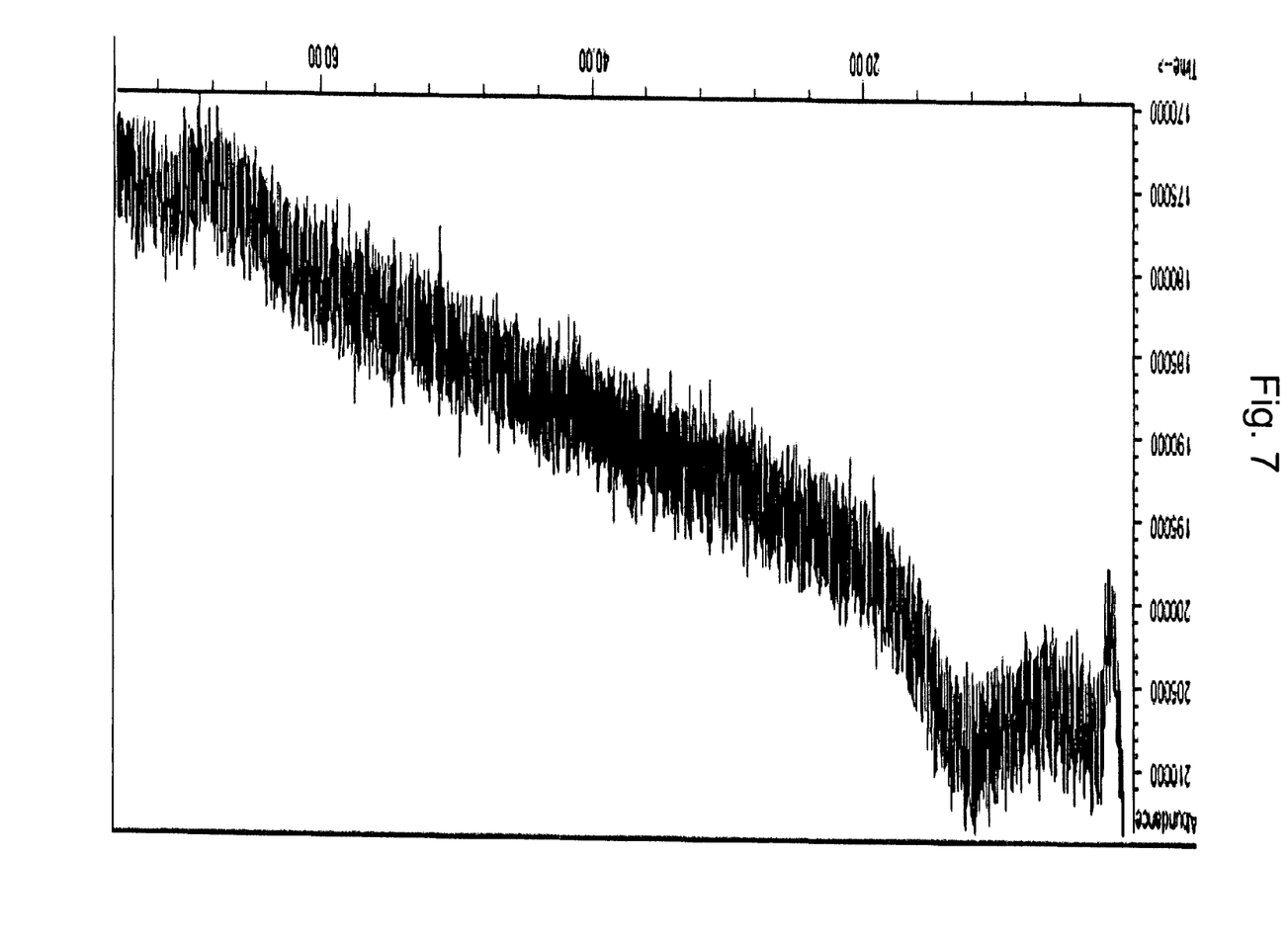
FIG. 7 is a total ion chromatogram of gas discharged from the anode active material prepared according to Comparative Example 1 analyzed using a mass spectrometer.

As illustrated in the total ion chromatograms of FIGS. 6 and 7, gas was generated on the surface of the polyethylene glycol modified silicon particles prepared according to Example 1 when the temperature ranged between 100 to 200° C.

Figure 8:
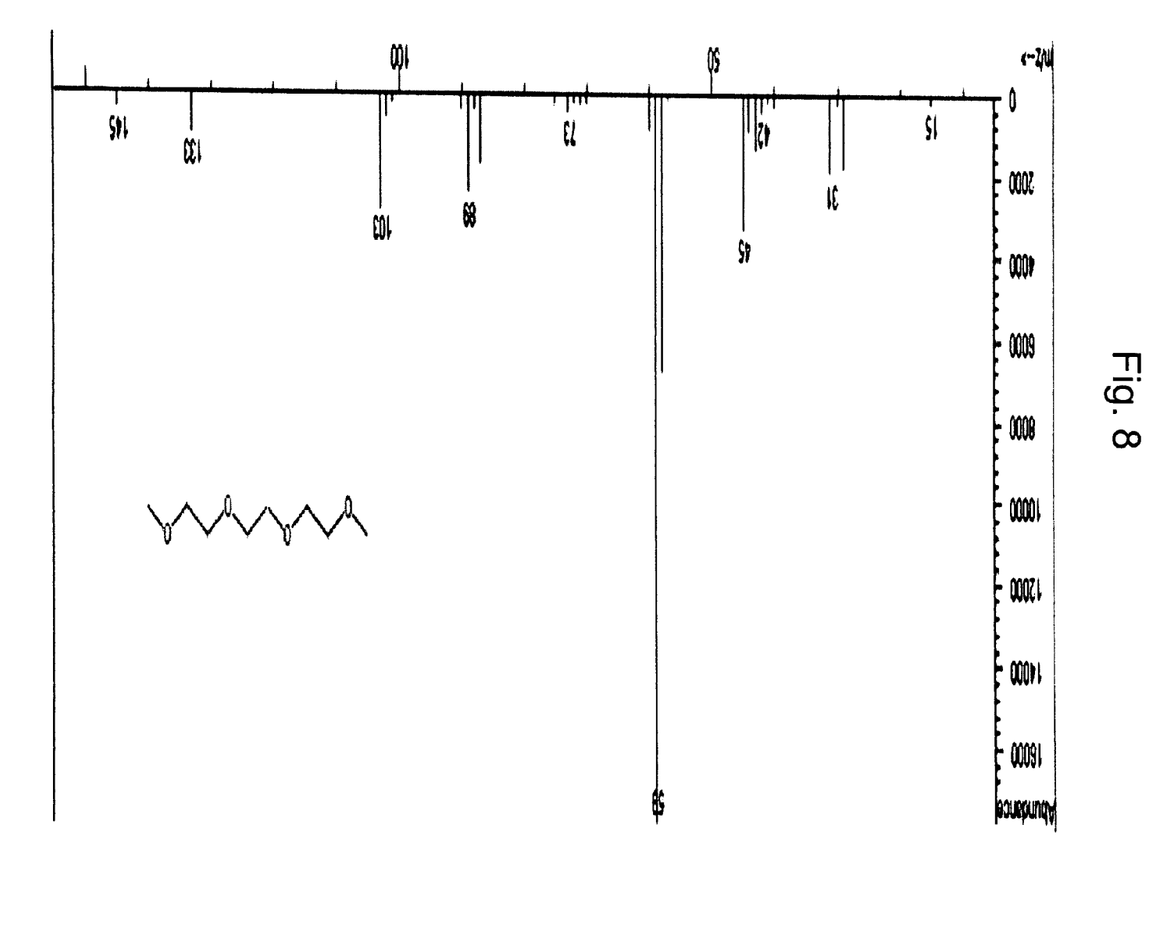
FIG. 8 is a mass spectrum of gas discharged from the anode active material prepared according to Example 1.

The gas generated from the anode active material prepared according to Example 1 at 160° C. was analyzed using the mass spectrometer and the results are illustrated in FIG. 8. The analysis confirmed that most of the generated gas resulted from the polyethylene glycol. Particularly, peaks were observed at molecular weights of 59 and 103. Accordingly, it was confirmed that polyethylene glycol is bonded to the surface of the silicon particles.

EXPERIMENTAL EXAMPLE 3

Analysis of Cycle Properties 0.8 g of the anode active material powder prepared according to each of Example 1 and Comparative Example 1, 1 g of graphite particles (SFG-6, TimCal) having an average diameter of 6 μm, and 0.2 g of polyvinylidene fluoride (PVDF, KF1100, Kureha Chemical Industry Co., Ltd., Japan) as a binder were mixed with an N-methylpyrrolidone (NMP) solution, and the mixture was coated on copper foil to prepare electrode plates.

The electrode plates were used as anodes, and Li was used as the cathodes to prepare 2016-type coin cells. Charge/discharge processes were performed 20 times between 1.2 and 0 V on each of the cells. Ethylene carbonate (EC) in which 1.03 M $LiPF_6$ was dissolved and diethylene carbonate (DEC) were mixed in a volume ratio of 3:7 to form an electrolyte solution. Charge/discharge processes were repeated between 0.001 and 1.5 V at a current of 100 mA/g. The results are illustrated in FIG. 9.

Figure 9:
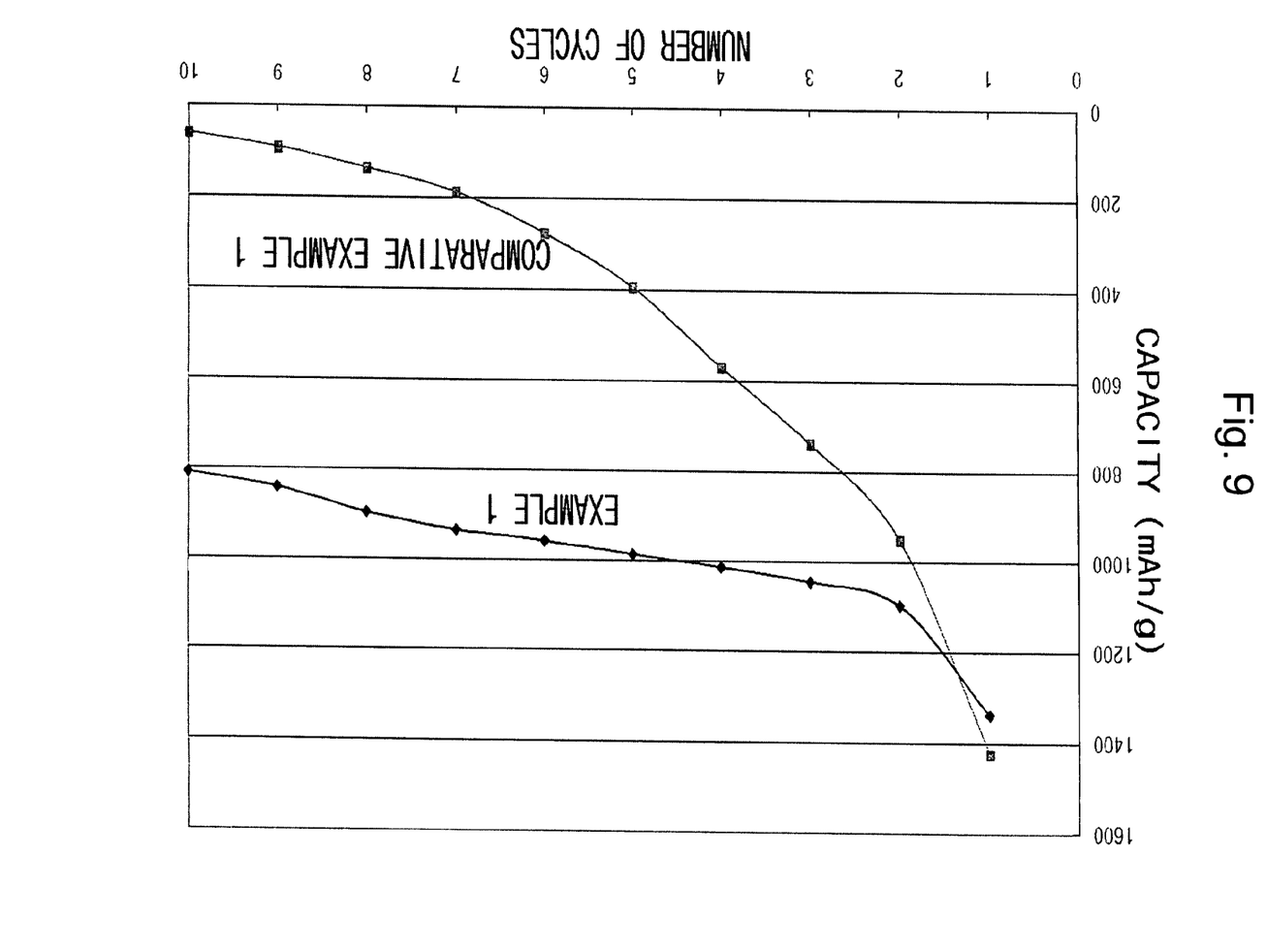
FIG. 9 is a graph comparing cycle properties of batteries employing the anode active materials prepared according to Example 1 and Comparative Example 1.

Referring to FIG. 9, the anode active material according to one embodiment of the present invention exhibited a higher initial discharge capacity than the conventional carbon-based material. In addition, in one embodiment of the present invention, the surface of the silicon particles was modified using polyethylene glycol, etc., thereby preventing decreases in capacity resulting from repeated charging and discharging and improving capacity retention properties.

The anode active material of the present invention has high charge/discharge capacity and excellent capacity retention properties. Thus, a lithium battery employing the anode active material has a long cycle lifespan.

While certain exemplary embodiments of the present invention have been illustrated and described, it will be understood by those of ordinary skill in the art that various modifications to the described embodiments may be made without departing from the spirit and scope of the present invention as defined by the attached claims and their equivalents.

What is claimed is:

1. An anode active material comprising:
   a plurality of metal particles comprising a metal capable of being alloyed with lithium; and
   a polymer comprising a plurality of linked alkylene oxide repeating units chemically bonded to a surface of the metal particles, wherein the alkylene oxide repeating units are selected from the group consisting of substituted alkylene oxide repeating units and unsubstituted alkylene oxide repeating units.

2. The anode active material of claim 1, wherein the alkylene oxide repeating units are selected from the group consisting of substituted ethylene oxide repeating units and unsubstituted ethylene oxide repeating units.

3. The anode active material of claim 1, wherein the polymer has a weight-average molecular weight ranging from about 400 to about 500,000.

4. The anode active material of claim 1, wherein the plurality of alkylene oxide repeating units comprises from 9 to 10,000 repeating units.

5. The anode active material of claim 1, wherein the polymer is selected from the group consisting of substituted oligoethylene glycols, unsubstituted oligoethylene glycols, substituted polyethylene glycols and unsubstituted polyethylene glycols.

6. The anode active material of claim 1, wherein the polymer comprises a polyethylene glycol.

7. The anode active material of claim 1, wherein the polymer is chemically bonded to the surface of the metal particles by directly bonding one end of the polymer to the surface of the metal particles.

8. The anode active material of claim 1, wherein the polymer is chemically bonded to the surface of the metal particles by bonding one end of the polymer to the surface of the metal particles by a siloxane bond.

9. The anode active material of claim 7, wherein the polymer is directly bonded to the surface of the metal particles by a covalent bond.

10. The anode active material of claim 8, wherein the siloxane bond is a covalent bond.

11. The anode active material of claim 1, wherein the metal particles comprise a metal selected from the group consisting of Si, Sn, Ge, Pb, Zn, Ag, Au, Al, alloys thereof and combinations thereof.

12. A lithium battery comprising an anode active material according to claim 1.

13. A lithium battery comprising:
    a cathode;
    an anode comprising:
      a plurality of metal particles comprising a metal capable of being alloyed with lithium; and
      a polymer comprising a plurality of linked alkylene oxide repeating units chemically bonded to a surface of the metal particles, wherein the alkylene oxide repeating units are selected from the group consisting of substituted alkylene oxide repeating units and unsubstituted alkylene oxide repeating units; and
    a separator.

14. The lithium battery of claim 13, wherein the alkylene oxide repeating units are selected from the group consisting of substituted ethylene oxide repeating units and unsubstituted ethylene oxide repeating units.

15. The lithium battery of claim 13, wherein the polymer has a weight-average molecular weight ranging from about 400 to about 500,000.

16. The lithium battery of claim 13, wherein the plurality of alkylene oxide repeating units comprises from 9 to 10,000 repeating units.

17. The lithium battery of claim 13, wherein the polymer is selected from the group consisting of substituted oligoethylene glycols, unsubstituted oligoethylene glycols, substituted polyethylene glycols and unsubstituted polyethylene glycols.

18. The lithium battery of claim 13, wherein the polymer is chemically bonded to the surface of the metal particles by directly bonding one end of the polymer to the surface of the metal particles.

19. The lithium battery of claim 13, wherein the polymer is chemically bonded to the surface of the metal particles by bonding one end of the polymer to the surface of the metal particles by a siloxane bond.

* * * * *